(12) United States Patent
Adachi

(10) Patent No.: US 10,810,438 B2
(45) Date of Patent: Oct. 20, 2020

(54) SETTING APPARATUS, OUTPUT METHOD, AND NON-TRANSITORY COMPUTER-READABLE STORAGE MEDIUM

(71) Applicant: CANON KABUSHIKI KAISHA, Tokyo (JP)

(72) Inventor: Keiji Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 15/855,458

(22) Filed: Dec. 27, 2017

(65) Prior Publication Data
US 2018/0121739 A1 May 3, 2018

Related U.S. Application Data

(63) Continuation of application No. 14/301,976, filed on Jun. 11, 2014, now Pat. No. 9,875,408.

(30) Foreign Application Priority Data

Jul. 9, 2013 (JP) ................................ 2013-143897

(51) Int. Cl.
*G06K 9/00* (2006.01)
*G06T 7/246* (2017.01)
*G06T 7/254* (2017.01)

(52) U.S. Cl.
CPC ..... *G06K 9/00771* (2013.01); *G06K 9/00369* (2013.01); *G06T 7/248* (2017.01);
(Continued)

(58) Field of Classification Search
CPC ............ G06K 9/00369; G06K 9/00771; G06T 7/248; G06T 7/254; G06T 2207/10016;
(Continued)

(56) References Cited

U.S. PATENT DOCUMENTS 7,791,466 B2   9/2010   Agarwalla et al.
8,938,092 B2   1/2015   Adachi
(Continued)

FOREIGN PATENT DOCUMENTS

JP   2002-373332 A   12/2002
JP   2006-333146 A   12/2006
(Continued)

OTHER PUBLICATIONS

Zhang et al., "Video Surveillance Using a Multi-Camera Tracking and Fusion System," Workshop on Multi-Camera and Multimodal Sensor Fusion Algorithms and Applications—M2SFA2 2008.

*Primary Examiner* — Katrina R Fujita
(74) *Attorney, Agent, or Firm* — Carter, DeLuca & Farrell LLP

(57) ABSTRACT

A setting apparatus that configures a setting for detecting that an object existing at different positions in images corresponding to different times has passed through a detection line or a detection area composites, on an image, an indication indicating a trajectory of an object in an image, and outputs the image on which the indication is composited, as a setting window for setting the detection line or the detection area.

21 Claims, 6 Drawing Sheets

(52) U.S. Cl.
CPC .... *G06T 7/254* (2017.01); *G06T 2207/10016* (2013.01); *G06T 2207/30196* (2013.01); *G06T 2207/30232* (2013.01); *G06T 2207/30241* (2013.01)

(58) Field of Classification Search
CPC . G06T 2207/30196; G06T 2207/30232; G06T 2207/30241
See application file for complete search history.

(56) References Cited

U.S. PATENT DOCUMENTS

| | | |
|---|---|---|
| 9,875,408 B2 | 1/2018 | Adachi |
| 2008/0316311 A1 | 12/2008 | Albers et al. |
| 2012/0086780 A1 | 4/2012 | Sharma et al. |
| 2012/0106792 A1 | 5/2012 | Kang et al. |
| 2013/0128050 A1 | 5/2013 | Aghdasi et al. |
| 2013/0162760 A1 | 6/2013 | Olavi |
| 2013/0265420 A1 | 10/2013 | Adachi |
| 2013/0342448 A1 | 12/2013 | Tanaka et al. |
| 2015/0220568 A1* | 8/2015 | Ueda .................. G01C 21/005 707/722 |

FOREIGN PATENT DOCUMENTS

| | | |
|---|---|---|
| JP | 2007-233919 A | 9/2007 |
| JP | 4096953 B2 | 6/2008 |
| JP | 2010-050934 A | 3/2010 |

\* cited by examiner

FIG. 2

| Object ID | 35 |
|---|---|
| Object ID | 34 |
| Object ID | 32 |
| Creation time | 2009/3/2/12:34:54 |

| Timestamp | 2009/3/2/12:34:54 |
|---|---|
| Timestamp | 2009/3/2/12:34:55 |
| Timestamp | 2009/3/2/12:34:56 |
| Timestamp | 2009/3/2/12:34:57 |
| Timestamp | 2009/3/2/12:34:58 |
| Position | (15,20) |
| Bounding box | (10,10), (20,30) |
| Size | 200 |

FIG. 3

| Parameter 1 | |
|---|---|
| Coordinates | (10,10), (20,30) |
| Region Type | Line |
| Size | 100 - 250 |
| Event | cross |

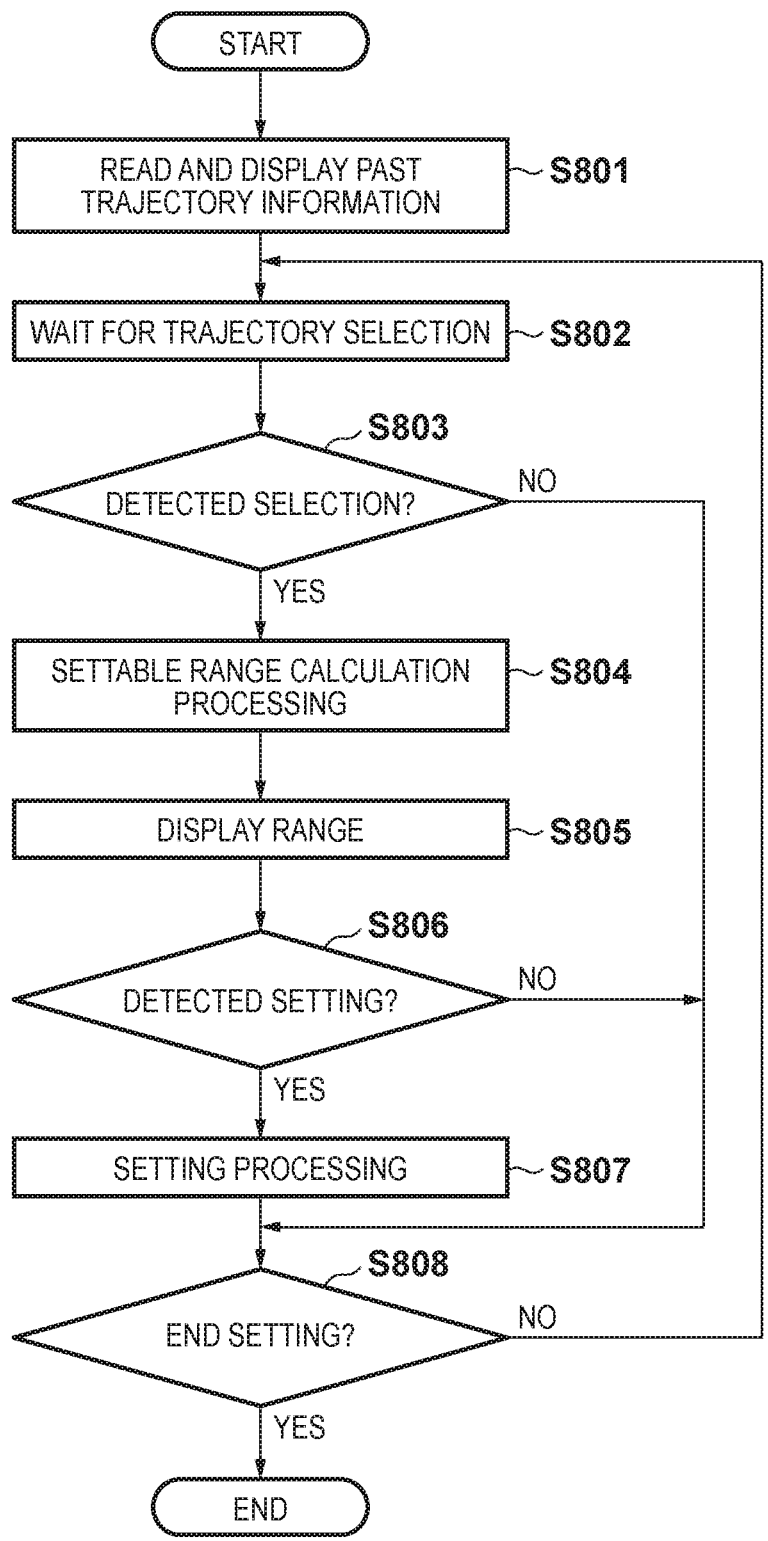

SETTING APPARATUS, OUTPUT METHOD, AND NON-TRANSITORY COMPUTER-READABLE STORAGE MEDIUM

CROSS REFERENCE TO RELATED APPLICATIONS

This application is a continuation of U.S. patent application Ser. No. 14/301,976, filed on Jun. 11, 2014, which claims the benefit of and priority to Japanese Patent Application No. 2013-143897, filed on Jul. 9, 2013, the entire contents of each of which are hereby incorporated by reference herein in their entireties.

BACKGROUND OF THE INVENTION

Field of the Invention

The present invention relates to a setting apparatus, an output method, and a non-transitory computer-readable storage medium.

Description of the Related Art

Conventionally, in the case of using a picture obtained from a monitoring camera or the like and detecting that an object such as a human body has passed through a specific point in the picture, it is detected that the object has passed through the specific point by tracking, within the screen, the object detected in the picture.

For example, in Japanese Patent Laid-Open No. 2002-373332, an object is detected based on a motion vector, the position of the object to be found in the next frame is estimated, and the object is tracked by means of template matching. In Japanese Patent Laid-Open No. 2010-50934, a face is detected, and face tracking is performed based on movement information detected from a correlation between a current frame and a past frame. It can be determined whether an object has passed through a specific point, based on a result of this tracking.

In general, in passage detection using video analysis processing, passage of an object is determined by detecting that a tracking line, which is a trajectory of object tracking, has intersected with a determination segment or a determination area frame that is set within a screen.

In Japanese Patent Laid-Open No. 2007-233919, intruder detection is performed by detecting a moving object within a camera image as a moving body and setting an entry prohibition line within the camera image. In Japanese Patent Laid-Open No. 2006-333146, it is proposed to set, as a detection area, a range formed by performing OR processing regarding a lower area of a moving body generated in time series within a visual field area.

Conventionally, when setting a detection line or a detection area for detecting passage of an object or the like within a screen, a person who configures this setting estimates a trajectory of a detection target object to some extent, and sets the detection line at an approximate position such that the detection line intersects with the estimated trajectory.

In particular, in the case where a camera is installed so as to perform monitoring obliquely from above, in the case where the camera is inclined, or in the case of a wide-angle lens, trajectory estimation is more difficult, and it is hard to find out where to set the detection line in the screen.

Furthermore, after the person who configures the setting sets a provisional detection line as above, it is necessary to take time and effort to conduct checking or a repeat of trial and error, such as to have a person actually pass through or to apply the provisional detection line to a past picture, in order to check whether the detection line enables passage to be detected in practice, resulting in troublesome setting operations.

As described above, there has conventionally been a problem in that it is difficult to easily set a detection line for detecting a desired moving object.

SUMMARY OF THE INVENTION

The present invention provides a technique for simplifying a setting of a detection area for detecting that an object has passed through the detection area that is set within a display screen.

According to the first aspect of the present invention, a non-transitory computer-readable storage medium storing a computer program for causing a computer to configure a setting for detecting that an object existing at different positions in images corresponding to different times has passed through a detection line, the computer program comprising: compositing, on an image, an indication indicating a trajectory of an object in the image; and outputting the image on which the indication is composited, as a setting window for setting the detection line.

According to the second aspect of the present invention, a non-transitory computer-readable storage medium storing a computer program for causing a computer to configure a setting for detecting that an object existing at different positions in images corresponding to different times has passed through a detection area, the computer program comprising: compositing, on an image, an indication indicating a trajectory of an object in the image; and outputting the image on which the indication is composited, as a setting window for setting the detection area.

According to the third aspect of the present invention, a method for outputting a setting window by a setting apparatus that configures a setting for detecting that an object existing at different positions in images corresponding to different times has passed through a detection line or a detection area, the method comprising: compositing, on an image, an indication indicating a trajectory of an object in the image; and outputting the image on which the indication is composited, as a setting window for setting the detection line or the detection area.

According to the fourth aspect of the present invention, a setting apparatus that configures a setting for detecting that an object existing at different positions in images corresponding to different times has passed through a detection line or a detection area, the apparatus comprising: a composition unit configured to composite, on an image, an indication indicating a trajectory of an object in the image; and an output unit configured to output the image on which the indication is composited, as a setting window for setting the detection line or the detection area.

Further features of the present invention will become apparent from the following description of exemplary embodiments with reference to the attached drawings.

BRIEF DESCRIPTION OF THE DRAWINGS

FIG. 2 is a diagram showing an exemplary configuration of information managed by a trajectory management unit 104.

FIG. 3 is a diagram showing an exemplary configuration of parameters for defining an object detection area.

FIG. 8 is a flowchart showing the details of processing in step S706.

DESCRIPTION OF THE EMBODIMENTS

Figure 1:
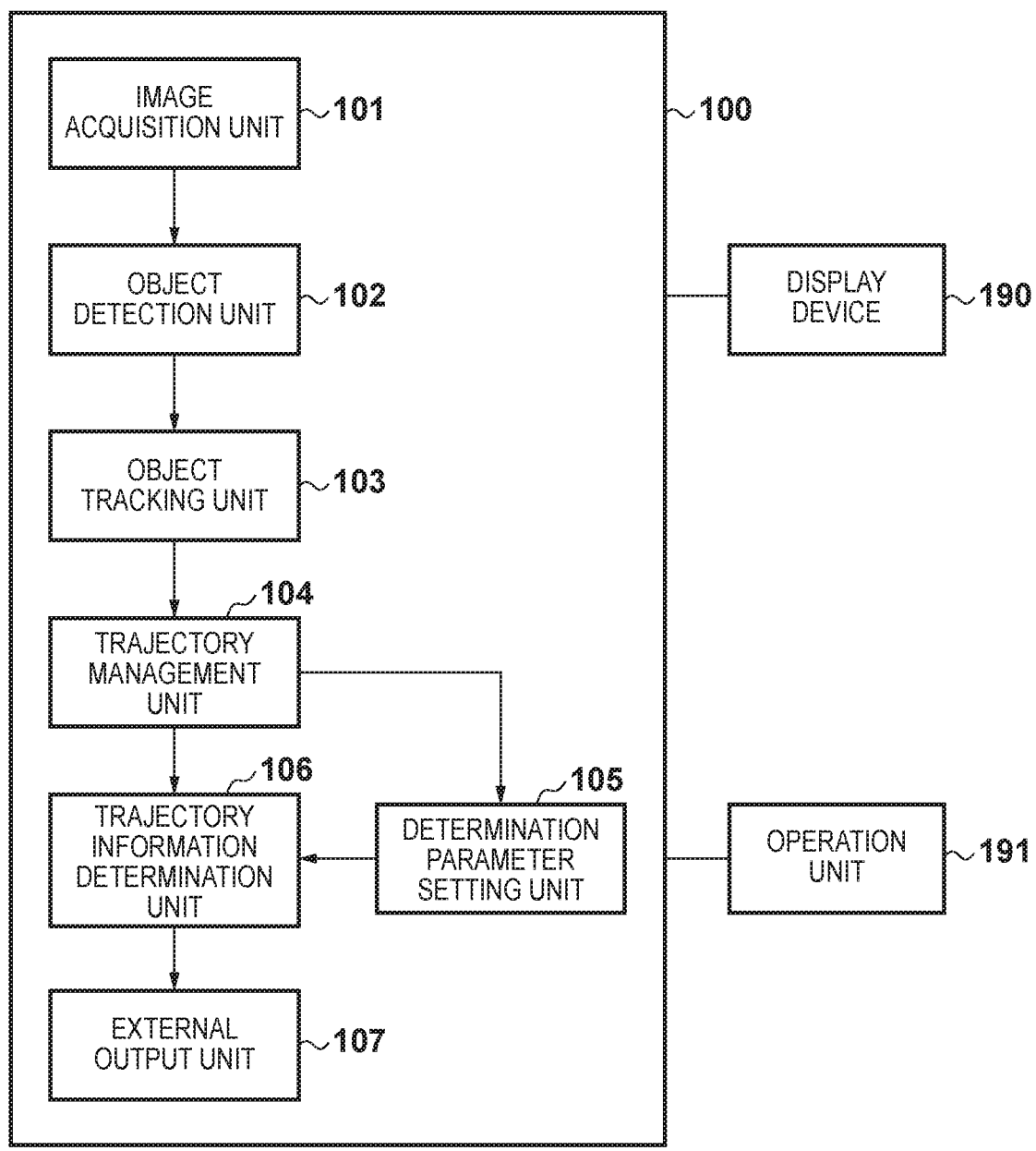
FIG. 1 is a block diagram showing an exemplary functional configuration of an image processing apparatus 100.

Hereinafter, an embodiment of the present invention will be described with reference to the attached drawings. Note that the embodiment described below indicates an exemplary case of specifically implementing the present invention, and is one specific example of the configuration recited in the scope of claims.

The present embodiment relates to an image processing apparatus that displays a moving picture showing a moving object on a display screen such that it is detected that the object moving within the display screen has passed through an object detection area that is set within the display screen.

Firstly, an exemplary functional configuration of the image processing apparatus according to the present embodiment will be described using the block diagram in FIG. 1. An image processing apparatus 100 may be a general PC (personal computer) as long as it can realize the aforementioned function of the image processing apparatus. The image processing apparatus 100 may also be an image processing circuit mounted in a camera capable of capturing a moving picture, or may be other kinds of device.

A part of the image processing apparatus 100 may be constituted by a camera, and the remaining part thereof may be constituted by a PC (or a tablet terminal, or a smartphone). In this mode, the camera and the PC may be connected to each other by a network such as a LAN.

A display device 190 constituted by a CRT, a liquid crystal screen, or the like, and an operation unit 191 constituted by a keyboard, a mouse, or the like are connected to the image processing apparatus 100. With this configuration, the image processing apparatus 100 can perform processing in accordance with various instructions that are input by user operations on the operation unit 191, and can display a result of the processing performed by the apparatus in the form of images or characters on the display device 190. The display device 190 and the operation unit 191 may be configured integrally as a touch panel. A description will be given below of the case of displaying a moving picture on a display screen of this display device 190.

An image acquisition unit 101 sequentially acquires images of respective frames constituting a moving picture in which one or more objects enter or move out of the frame in the display screen or are moving within the display screen, over a plurality of frames. The image acquisition unit 101 sequentially sends out the acquired images of the respective frames to an object detection unit 102. The moving picture may be acquired from an image sensing device capable of capturing a moving picture, or may be acquired from a device that stores such moving pictures in advance, and the acquisition source thereof is not limited to a specific acquisition source.

The object detection unit 102 detects an object appearing in the image of each frame received from the image acquisition unit 101, using a technique such as a background subtraction method. Of course the method for detecting an object is not limited to a specific method. Upon detecting an object in an image of a certain frame, the object detection unit 102 creates various kinds of information, which will be described later, related to this detection.

If the object detection unit 102 detects, in the image of a frame of interest, the same object as an object detected in the previous frame of the frame of interest, an object tracking unit 103 associates the objects in these frames with each other. It is determined whether or not the objects detected in the two frames are the same, based on a difference between positions of the two objects in the frames, or the size (or the color, etc.) of the two objects.

For example, the object tracking unit 103 assigns an object ID=A to the object detected in the previous frame of the frame of interest by the object detection unit 102. If the object detection unit 102 also detects this object in the image of the frame of interest, the object tracking unit 103 also assigns the object ID=A to this object. Thus, if the same object is detected in a plurality of frames, the same object ID is assigned to the same object in these frames.

Note that a new object ID is assigned to an object that is newly detected in the frame of interest.

A trajectory management unit 104 manages information regarding each object obtained by the object detection unit 102 and the object tracking unit 103. FIG. 2 shows an exemplary configuration of the information managed by the trajectory management unit 104. The trajectory management unit 104 is connected to a memory for storing this information.

Information (object information) 202 regarding each object is managed in management information 201 managed by the trajectory management unit 104. In other words, the object information 202 regarding each object ID is managed in the management information 201. In the object information 202 regarding one object, information 203 regarding each frame ("Timestamp") in which the object was detected is managed. This information 203 contains a detection coordinate position ("Position"), information ("Boundingbox") defining a circumscribed rectangle including the area of the detected object, and the size ("Size") of the object. The coordinate position is, for example, coordinates of a center position of the circumscribed rectangle of the object, or coordinates of a centroid point thereof.

In FIG. 2, the information ("Boundingbox") defining the circumscribed rectangle including the object area is the coordinate position of the upper left corner and the coordinate position of the lower right corner of this circumscribed rectangle. The size ("Size") of the object indicates the number of pixels in the circumscribed rectangle. Of course the information that may possibly be contained in the object information is not limited thereto, and any kind of information may be contained in the object information as long as the later-described processing can be achieved.

The determination parameter setting unit 105 determines parameters for determining whether or not an object within the image of each frame has passed through the object detection area, i.e., parameters for defining this object detection area. The determination parameter setting unit 105 sets the above-determined parameters in a trajectory information determination unit 106. The trajectory information determination unit 106 is connected to a memory for storing these parameters.

FIG. 3 shows an exemplary configuration of the parameters for defining the object detection area. The parameters shown in FIG. 3 define, as the object detection area, a segment ("Line") connecting coordinates (10, 10) and coordinates (20, 30) in the display screen of the display device 190. These parameters define that if an object having the size ("Size") of 100 to 250 has passed through ("cross") this object detection area ("Line"), this object is set to a detection target.

Figure 5:
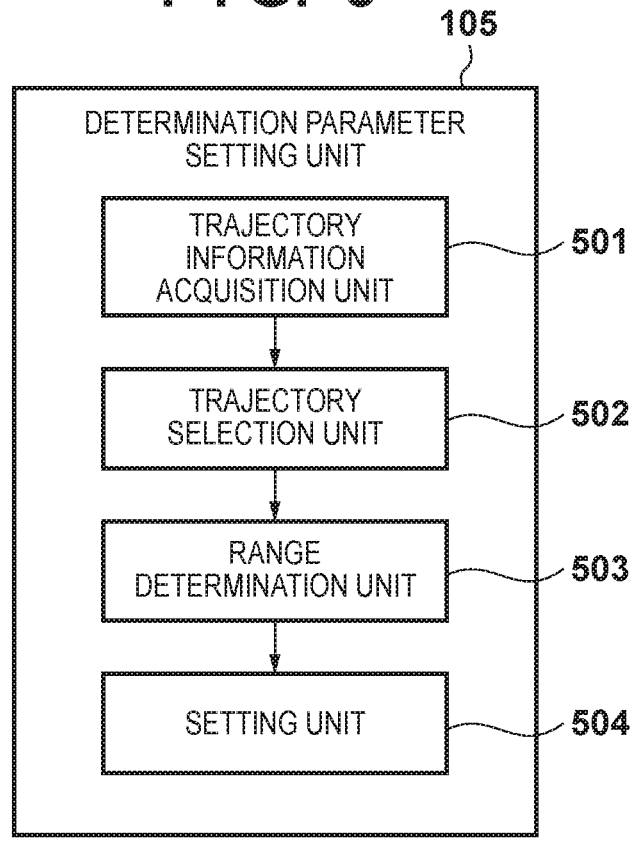
FIG. 5 is a block diagram showing an exemplary configuration of a determination parameter setting unit 105.

Here, an exemplary configuration of the determination parameter setting unit 105 will be described using the block diagram in FIG. 5.

For each object, the trajectory information acquisition unit 501 acquires, from the trajectory management unit 104, a detection coordinate position (information of "Position" in FIG. 2) at which the object is detected in each frame, as a trajectory of this object. For example, the trajectory information acquisition unit 501 acquires a detection coordinate position group in the object information 202 regarding the object with the object ID=A, as the trajectory of the object with the object ID=A. Thus, the trajectory information acquisition unit 501 acquires the trajectory of the object from the object information 202 regarding each object.

Figure 6A:
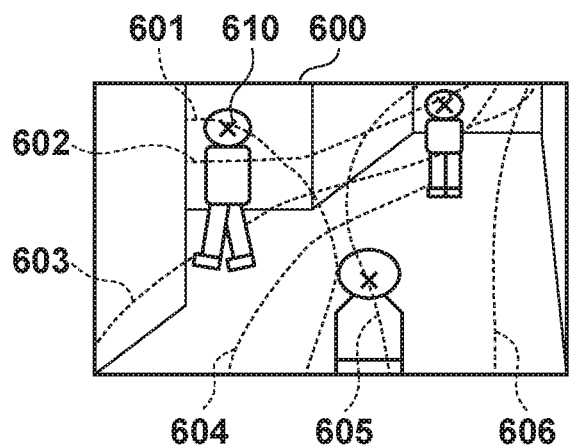
FIGS. 6A and 6B are diagrams showing exemplary display of trajectories and exemplary display of designated trajectories.

The trajectory information acquisition unit 501 then displays the trajectory of each object on the display screen of the display device 190. FIG. 6A shows exemplary display of trajectories of the respective objects. In FIG. 6A, trajectories (601 to 606) of the respective objects acquired by the trajectory information acquisition unit 501 are displayed so as to be superimposed on the image sequentially obtained from the image sensing device, which is the source from which the moving picture is acquired by the image acquisition unit 101. Note that FIG. 6A shows an example in which the head of each human body is detected and the center of the circumscribed rectangle of the head is the detection coordinate position. A trajectory may be a segment connecting detection coordinate positions, or may be a spline curve obtained based on the detection coordinate positions. In the following description, the case where the trajectory information acquisition unit 501 displays the display screen in FIG. 6A on the display device 190 will be taken as an example.

The user operates the operation unit 191 and designates one or more trajectories displayed on the display device 190 as designated trajectories (trajectories of objects that have made a movement that the user wants to detect) (e.g., the user moves a mouse pointer onto a target trajectory and clicks the mouse there). A trajectory selection unit 502 notifies a range determination unit 503 of information of the designated trajectories designated by the user (the detection coordinate positions constituting the designated trajectories).

For example, in the case of FIG. 6A, if an object passing through a path (i.e., coming out of the path or entering the path) on the left when facing the screen is set to a detection target, the trajectory 601 and the trajectory 602 are designated as the designated trajectories. A description will be given below of the case of designating the trajectory 601 and the trajectory 602 as the designated trajectories.

Figure 6B:
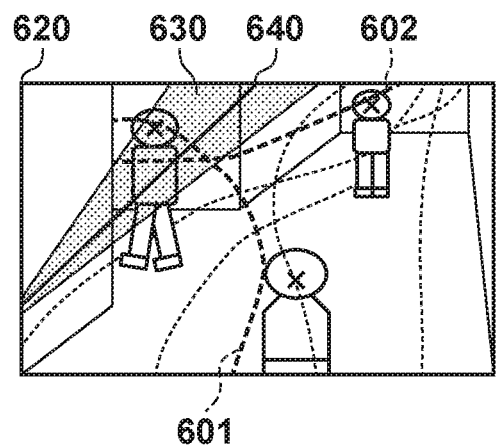

Note that if the user designates one or more trajectories, the trajectory selection unit 502 may change the display mode for the designated trajectories to a different display mode from that for undesignated trajectories, as shown in FIG. 6B. In the case of FIG. 6B, undesignated trajectories 603 to 606 are displayed with thin dotted lines, while the designated trajectory 601 and trajectory 602 are displayed with thick dotted lines. Of course the different display modes for the designated trajectories and the undesignated trajectories are not limited thereto.

The range determination unit 503 determines (calculates) a range in which the object detection area can be disposed such that, on the display screen of the display device 190, the frame of the object detection area has an intersection point with each of the designated trajectories and does not have an intersection point with the undesignated trajectories. Note that if the object detection area is a segment, "the frame of the object detection area" indicates this very segment.

In the case of FIG. 6A, a range in which the object detection area can be set is determined such that the frame of the object detection area has an intersection point with each of the trajectory 601 and the trajectory 602 and does not have an intersection point with the trajectories 603 to 606. The method by which the range determination unit 503 determines this range will be described later.

The range determination unit 503 then displays an image indicating the above-determined range on the display screen of the display device 190. For example, it is assumed that the object detection area is a segment (detection line) (the case where "Region Type" in FIG. 3 is "Line"). In this case, as shown in FIG. 6B, an image 630 indicating the range in which the detection line having an intersection point with each of the trajectory 601 and the trajectory 602 and not having an intersection point with the trajectories 603 to 606 can be set is displayed on the display device 190.

As a result of presenting this image 630, the user can understand the range in which "a detection line with which only an object corresponding to a designated trajectory is detected, and with which an object corresponding to an undesignated trajectory is not a detection target" can be set. In FIG. 6B, reference numeral 640 denotes the detection line that is set within the range indicated by the image 630, by the user operating the operation unit 191. Note that this detection line may also be determined by the range determination unit 503 so as to be included in the image 630 indicating the range, without any user operation.

Upon the user operating the operation unit 191 and inputting completion of the setting of the object detection area, a setting unit 504 sets, in the trajectory information determination unit 106, parameters for defining the set object detection area.

A description will now be given of the method by which the range determination unit 503 determines the range in which the detection line can be set. In the following description, a range is determined in which the detection line can be set so as to have an intersection point with each of the trajectory 601 and the trajectory 602 and so as not to have an intersection point with the trajectories 603 to 606. Here, for the sake of simplification of the description, the starting point and the end point of the detection line to be disposed are always in contact with an end (any of the upper end, lower end, left end, and right end) of the display screen.

The trajectory of an object is represented by a set of segments connecting detection coordinate positions ("Position") of the object in time series. Accordingly, the range determination unit 503 need only obtain a possible range of the line that intersects with any of the segments constituting the designated trajectories (segment sets) and does not intersect with any of the undesignated trajectories (segment sets).

Although various methods for determining intersection between two segments are known, a simple example will be described here. A line (detection line) can be represented by a linear function, such as $y=ax+b$ (a is a slope, and the value b is the y-intercept). If one point (detection coordinate position ("Position")) on a segment is above the line represented by this linear function and another point on this segment is below the line, it can be determined that the segment and the line (detection line) intersect with each other.

Furthermore, regarding intersection between two segments, if a line passing through one of the segments, or the first segment, intersects with the other segment, or the second segment, and a line passing through the second segment intersects with the first segment, these two segments intersect with each other. That is to say, in the case of the detection line, it need only be determined whether or not a condition (intersection condition) is satisfied with respect to two end points of a target segment, that is, whether or not one end point of the target segment satisfies one of $y-ax-b>0$ and $y-ax-b<0$ and the other end point satisfies the other of $y-ax-b>0$ and $y-ax-b<0$. If this intersection condition is satisfied, it can be determined that the target segment intersects with $y=ax+b$.

To obtain the range of a and b, provisional end points are set at appropriate intervals (of about 10 pixels) on the periphery sides (upper, lower, right, and left sides) of the display screen (e.g., 33 points on the upper side and 25 points on the left sides in the case of the screen size of 320-pixel height×240-pixel width). The aforementioned intersection determination is performed using a line group including all combination of lines each connecting two of those points (a point on one side and a point on another side), and the possible range of a and b that satisfy the condition can thereby be obtained.

The setting unit 504 then sets, in the trajectory information determination unit 106, parameters (in the above example, a and b that are the parameters for defining the detection line) for defining the object detection area disposed on the screen by the user operating the operation unit 191.

Although the detection line in the present embodiment is a line and the starting point and the end point of the detection line are always in contact with an end of the display screen, this need not be the case. For example, if provisional end points of the detection line to be set are not the points on the peripheral sides of the screen but provisional end points on a grid that is set on the display screen, the end points of the detection line can thereby be provided at any positions, rather than on the peripheral sides of the display screen.

Alternatively, it is also possible to determine intersection between a segment group of a trajectory and a curve obtained by using provisional end points of the detection line as nodes of a Bezier curve or a spline curve, and to obtain the possible range of the detection line by repeating this determination for all trajectories.

In any case, any kind of method may be employed as long as the range can be determined in which the detection line can be set so as to have an intersection point with each of the designated trajectories (the trajectory 601 and the trajectory 602) and so as not to have an intersection point with the undesignated trajectories (the trajectories 603 to 606). This also applies to the case where the object detection area has a form other than the detection line.

Note that although the trajectory of the object that the user wants to detect is designated in the above example, on the contrary, the trajectory of an object that the user does not want to detect may also be designated. In this case, the description of the present embodiment need only be read by replacing trajectories that are not designated with designated trajectories.

Furthermore, both the trajectory of the object that the user wants to detect and the trajectory of the object that the user does not want to detect may be designated. In this mode, the range in which the object detection area can be set is determined so as to have an intersection point with the designated trajectory of the object that the user wants to detect and so as not to have an intersection point with the trajectory of the object that the user does not want to detect.

In the above example, the range determination unit 503 displays the range in which the detection line can be set, after the designation of the designated trajectories is completed. However, the timing of displaying the range in which the detection line can be set is not limited thereto, and the range determination unit 503 may perform the above-described range determination processing and display the image indicating the determined range, every time a designated trajectory is designated.

Although the trajectory of each object managed by the trajectory management unit 104 is displayed on the display screen in the above example, a trajectory of an object that satisfies a prescribed condition or a trajectory that satisfies a prescribed condition may be displayed. Furthermore, the display mode for the range in which the detection line can be set may be changed in accordance with the prescribed condition.

For example, since the trajectory management unit 104 manages the detection coordinate position of each object and the date and time corresponding to this detection coordinate position, the moving speed of this object on the trajectory thereof can be obtained using this information. This moving speed may be any of the highest speed, the lowest speed, and the average speed on the trajectory. The trajectory information acquisition unit 501 acquires, from the trajectory management unit 104, the trajectory of the object whose moving speed is larger than or equal to a threshold value, and displays the acquired trajectory on the display screen.

Thus, as a result of not displaying the trajectory of the object whose moving speed is smaller than the threshold value, even if, for example, a shade appearing due to declination of the sun as time elapses is detected as an object by error, the trajectory of this object is not displayed. This configuration enables a useful range in which the object detection area can be set to be calculated such that only the trajectories of objects other than such an object detected by error are taken into account.

Furthermore, the aforementioned prescribed condition may be changed as appropriate by the user operating the operation unit 191, and every time the condition is changed, the trajectory information acquisition unit 501 may display trajectories that match the condition.

Furthermore, the aforementioned prescribed condition may be a combination of the moving speed and other analysis elements such as, for example, the moving direction of the object, human body detection, or age/gender detection. For example, in the case where the user wants to set a male who passes through a path on the left side and is estimated to be in his 40's as the object to be a passage detection target, conditions such as "left side" and "a male estimated to be in his 40's" are used as the aforementioned prescribed conditions. Of course the image processing apparatus 100 may again determine whether or not an object detected after setting these conditions satisfies the prescribed conditions, or the object may be displayed on the display device 190 such that the user visually checks the object.

Although there are cases where the number of candidate trajectories to be displayed is too small as a result of thus adding conditions, in such cases a warning is given to the user by means of message notification via the display device 190 as appropriate so as to prompt the user to set appropriate conditions.

Furthermore, only the trajectories corresponding to one or more persons designated by the user operating the operation unit 191 may be displayed by identifying "who" each object appearing in the image of each frame is. Furthermore, only the trajectory of a person regarding whom it has been determined that he/she "has passed through the path many times" over a plurality of frames may be displayed.

Although the detection coordinate position of each object in each frame managed by the trajectory management unit 104 is acquired as the trajectory of the object in the above example, the trajectory of the object may be acquired by other methods. For example, the trajectory of each object may be acquired from "history data of past trajectories of each object" that is registered in the apparatus or in an external device.

Alternatively, a trajectory collection mode may be prepared in which trajectories of objects are collected during a certain period of time before determining the detection line, so as to collect the trajectories of the respective objects in this state. However, it is desirable to obtain a past trajectory to be used from images shot by the same camera at the same location and at the same angle of view. This is because, if different sensed images are used, the trajectories on the images differ from each other.

Alternatively, even with trajectories obtained using different cameras, the trajectories to be used can be obtained by performing coordinate transformation on a trajectory in an image sensed at a different position into a trajectory in the camera subjected to a detection setting. However, to use this method, relative coordinates in a three-dimensional space and the angel of view of the cameras with which coordinate transformation for trajectories is performed are required. The method for acquiring the trajectory of an object is not limited to the above methods, and any kinds of method may be used as long as the trajectory of an object in the camera for performing detection can be obtained.

In the above example, a past trajectory is acquired, the range in which the detection line can be set is determined based on the past trajectory, and thereafter the detection line is determined, within the image processing apparatus 100. However, this processing may be performed by a device other than the image processing apparatus 100.

Although the object detection area in the above example is two-dimensionally expressed as a line on an image, the object detection area may also be an area having a shape other than a line or that is set in a three-dimensional space. The detection line is included in a detection area in a broad sense.

Returning to FIG. 1, the trajectory information determination unit 106 performs processing for determining whether the object has passed through the object detection area that is set on the display screen, in accordance with the parameters that are set by the determination parameter setting unit 105 and the information managed by the trajectory management unit 104. The trajectory information determination unit 106 determines whether the trajectory of the object detected in the image (an image other than the image used to set the parameters) acquired by the image acquisition unit 101 after the parameters are set passes through the area or the line defined by the parameters that are set by the determination parameter setting unit 105.

Figure 4:
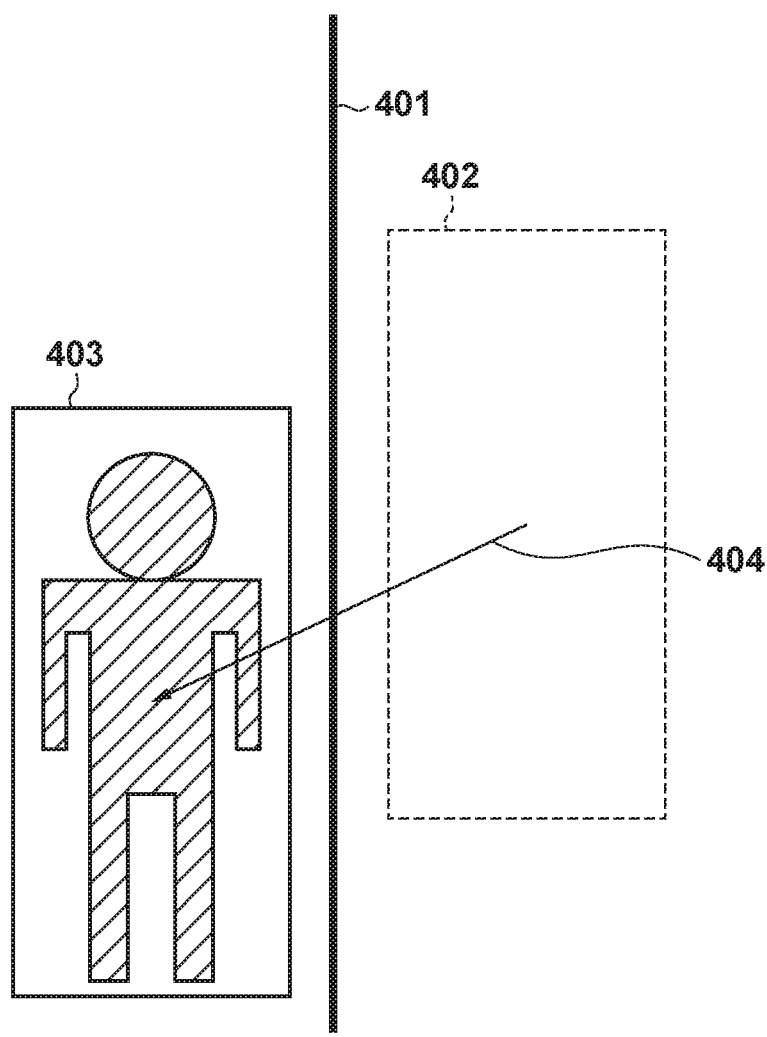
FIG. 4 is a diagram illustrating processing performed by a trajectory information determination unit 106.

Processing performed by the trajectory information determination unit 106 in the case where the parameters shown in FIG. 3 are set will now be described using FIG. 4.

The determination processing performed by the trajectory information determination unit 106 is as described below. That is to say, it is determined whether a moving vector 404 from a circumscribed rectangle 402 of the object in the previous frame of the frame of interest toward a circumscribed rectangle 403 of the object in the frame of interest has intersected with a segment (object detection area) 401 defined by the parameters. Determination of intersection is determination of whether or not the object has passed through the segment 401.

Note that although the value of "Position" in FIG. 2 is used as the position (trajectory line position) of an object to be used to obtain the moving vector of the object in the present embodiment, other values may also be employed. For example, the upper end, lower end, right end, left end, centroid, or the like of the object may be the point to be detected when passage detection is performed. In a possible exemplary case of setting the lower end as the point to be detected, when an object is a human body, it is determined that an object has passed through when the leg position of the object has passed through the detection line. If the point to be detected is changed, naturally the position of the trajectory also changes slightly. Furthermore, as mentioned above, it is also possible to calculate the range in which the detection line can be set and update the display every time the operation of changing the point to be detected is performed.

The result of the determination performed by the trajectory information determination unit 106 may be output to the outside via an external output unit 107. If the external output unit 107 is a display unit constituted by a CRT, a liquid crystal screen, or the like, the external output unit 107 may be used in place of the display device 190. The result of the determination performed by the trajectory information determination unit 106 may also be displayed on the display device 190.

Figure 7:
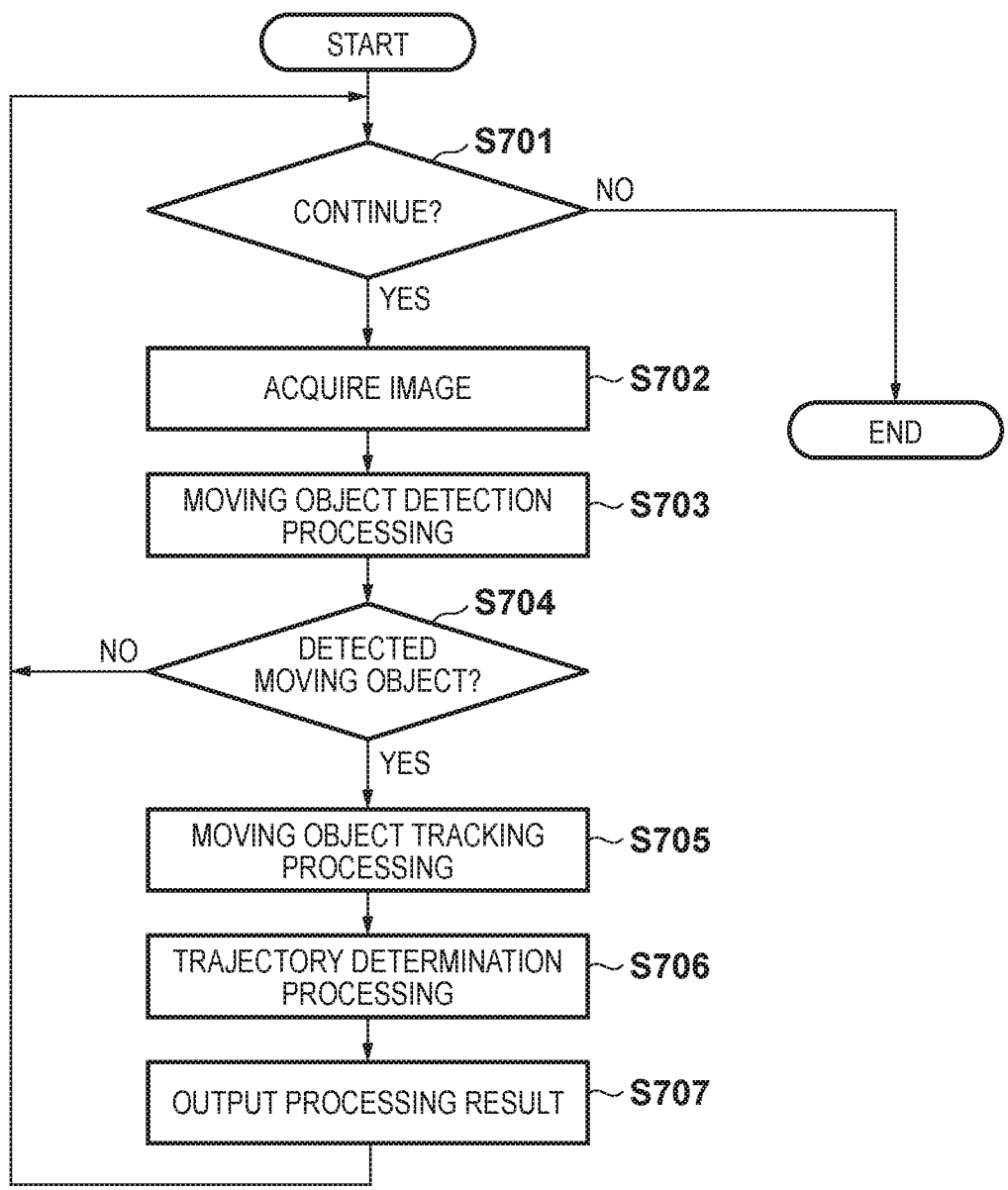
FIG. 7 is a flowchart of processing performed by the image processing apparatus 100.

Next, a description will be given of processing by which the image processing apparatus 100 according to the present embodiment detects that an object has passed through the object detection area, using FIG. 7 showing the flowchart of this processing.

Note that when the processing according to the flowchart in FIG. 7 is started, the object detection area has already been set by the determination parameter setting unit 105, and the parameters for defining the object detection area have been set by the trajectory information determination unit 106. Furthermore, when the processing according to the flowchart in FIG. 7 is started, the management information such as that shown in FIG. 2 has been registered in a memory that can be accessed by the image processing apparatus 100. However, as described below, the management information such as that shown in FIG. 2 is updated at any time, every time an object is detected.

If a condition under which the processing is terminated is satisfied, e.g., when the user operates the operation unit 191 and inputs an instruction to terminate the processing, the processing ends via step S701. On the other hand, if the condition under which the processing is terminated is not satisfied, the processing proceeds to step S702 via step S701.

In step S702, the image acquisition unit 101 sequentially acquires an image of each frame constituting a moving picture in which one or more objects enter or move out of the frame in the display screen or are moving within the display screen, over a plurality of frames.

In step S703, the object detection unit 102 detects an object appearing in a frame image received from the image acquisition unit 101, using a technique such as a background subtraction method. If no object can be detected as a result of this detection, the processing returns to step S701 via step S704, and if one or more objects are detected, the processing proceeds to step S705 via step S704.

In step S705, the object tracking unit 103 associates objects in frames with each other. That is to say, if the same object as an object detected in the previous frame of a frame (a frame of interest) on which object detection is performed in step S703 is detected in the image of the frame of interest, the objects in these frames are associated with each other. That is to say, as a result of the processing in step S703 and step S705, the management information shown as an example in FIG. 2 is updated at any time.

In step S706, the trajectory information determination unit 106 determines whether each object has passed through the object detection area defined by the parameters that are set by the determination parameter setting unit 105. In step S707, the external output unit 107 outputs, to an appropriate output destination, a result of the passage determination processing performed in step S706 by the trajectory information determination unit 106.

Next, a description will be given of exemplary processing performed by the determination parameter setting unit 105 in order to set the parameters for defining the object detection area in the trajectory information determination unit 106 before the processing according to the flowchart in FIG. 7 is performed, using FIG. 8 showing the flowchart of the processing. Note that the processing according to the flowchart in FIG. 8 may be performed not only before the processing according to the flowchart in FIG. 7 is started, but also thereafter again at an appropriate timing.

In step S801, for each object, the trajectory information acquisition unit 501 acquires, from the trajectory management unit 104, a detection coordinate position of the object in each frame, as a trajectory of this object. The trajectory information acquisition unit 501 then displays the trajectory of each object on the display screen of the display device 190.

In step S802, the trajectory selection unit 502 waits for selection by the user for selecting, as the designated trajectories, one or more trajectories displayed on the display device 190. If the trajectory selection unit 502 detects that the user has operated the operation unit 191 and designated, as the designated trajectories, one or more trajectories displayed on the display device 190, the processing proceeds to step S804 via step S803. On the other hand, if not, the processing proceeds to step S808 via step S803.

In step S804, the range determination unit 503 determines the range in which the object detection area can be disposed such that, on the display screen of the display device 190, the frame of the object detection area has an intersection point with each of the designated trajectories and does not have an intersection point with undesignated trajectories. In step S805, the range determination unit 503 displays an image indicating the range determined in step S804, on the display screen of the display device 190.

If the setting unit 504 detects that the user has operated the operation unit 191, set the object detection area, and input completion of the setting, the processing proceeds to step S807 via step S806. On the other hand, if not, the processing proceeds to step S808 via step S806. In step S807, the setting unit 504 sets, in the trajectory information determination unit 106, the parameters for defining the object detection area that is set by the user operation. Note that this detection area may also be determined by the range determination unit 503 so as to be included in the range in which the object detection area can be disposed, without any user operation.

If the condition under which the processing is terminated is satisfied, e.g., when the user operates the operation unit 191 and inputs an instruction to terminate the processing, the processing ends via step S808. On the other hand, if the condition under which the processing is terminated is not satisfied, the processing returns to step S802 via step S808.

As described above, according to the present embodiment, the detection area for improving detection accuracy when detecting an object can be easily set, and the burden related to this setting on the user can be reduced.

Although all units shown in FIG. 1 may be configured by hardware, a part or all of these units may also be configured by software (a computer program). In this case, this computer program is installed in a memory in the image processing apparatus 100, and a CPU in the image processing apparatus 100 executes the computer program. Thus, this image processing apparatus 100 realizes the operations of the units shown in FIG. 1.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer-readable storage medium storing a computer program for causing a computer to perform a method for causing a display unit to display a setting window for setting a detection line in an image for detecting an object that passes through the detection line, the method comprising:
receiving the image captured by an imaging unit;
acquiring a trajectory of an object in the image; and
causing the display unit to display the setting window including the image on which a plurality of trajectories acquired in the acquiring are superimposed,
wherein a guide indicating an area for setting the detection line in the image is displayed on the setting window, the area being determined on the basis of user designation for selecting one or more trajectories from the plurality of trajectories.

2. The non-transitory computer-readable storage medium according to claim 1, further comprising setting the detection line based on the user designation for designating the detection line on the image.

3. The non-transitory computer-readable storage medium according to claim 1, wherein the setting window includes the image on which the plurality of trajectories are superimposed so that an appearance of the one or more trajectories selected by the user designation is different from an appearance of one or more other trajectories.

4. The non-transitory computer-readable storage medium according to claim 1, wherein the area is determined so that the detection line which intersects with the one or more trajectories selected by the user designation and does not intersect with one or more other trajectories, included in the plurality of trajectories, is settable in the area.

5. The non-transitory computer-readable storage medium according to claim 1, wherein the setting window includes the image on which a trajectory of the object satisfying a predetermined condition is superimposed.

6. The non-transitory computer-readable storage medium according to claim 5, wherein the setting window includes the image on which a trajectory of the object moving in a predetermined direction is superimposed.

7. The non-transitory computer-readable storage medium according to claim 5, wherein the setting window includes the image on which a trajectory corresponding to a person designated by a user is superimposed.

8. A method for causing a display unit to display a setting window for setting a detection line in an image for detecting an object that passes through the detection line, the method comprising:
receiving the image captured by an imaging unit;
acquiring a trajectory of an object in the image; and
causing the display unit to display the setting window including the image on which a plurality of trajectories acquired in the acquiring are superimposed,
wherein a guide indicating an area for setting the detection line in the image is displayed on the setting window, the area being determined on the basis of user designation for selecting one or more trajectories from the plurality of trajectories.

9. The method according to claim 8, further comprising setting the detection line based on the user designation for designating the detection line on the image.

10. The method according to claim 8, wherein the setting window includes the image on which the plurality of trajectories are superimposed so that an appearance of the one or more trajectories selected by the user designation is different from an appearance of one or more other trajectories.

11. The method according to claim 8, wherein the area is determined so that the detection line which intersects with the one or more trajectories selected by the user designation and does not intersect with one or more other trajectories, included in the plurality of trajectories, is settable in the area.

12. The method according to claim 8, wherein the setting window includes the image on which a trajectory of the object satisfying a predetermined condition is superimposed.

13. The method according to claim 12, wherein the setting window includes the image on which a trajectory of the object moving in a predetermined direction is superimposed.

14. The method according to claim 12, wherein the setting window includes the image on which a trajectory corresponding to a person designated by a user is superimposed.

15. An information processing apparatus for causing a display unit to display a setting window for setting a detection line in an image for detecting an object that passes through the detection line, the information processing apparatus comprising:
a computer executing instructions that, when executed by the computer, cause the computer to:
receive the image captured by an imaging unit;
acquire a trajectory of an object in the image; and
cause the display unit to display the setting window including the image on which a plurality of trajectories acquired in the acquisition are superimposed,
wherein a guide indicating an area for setting the detection line in the image is displayed on the setting window, the area being determined on the basis of user designation for selecting one or more trajectories from the plurality of trajectories.

16. The information processing apparatus according to claim 15, wherein the instructions, when executed by the computer, cause the computer to set the detection line based on the user designation for designating the detection line on the image.

17. The information processing apparatus according to claim 15, wherein the setting window includes the image on which the plurality of trajectories are superimposed so that an appearance of the one or more trajectories selected by the user designation is different from an appearance of one or more other trajectories.

18. The information processing apparatus according to claim 15, wherein the area is determined so that the detection line which intersects with the one or more trajectories selected by the user designation and does not intersect with one or more other trajectories, included in the plurality of trajectories, is settable in the area.

19. The information processing apparatus according to claim 15, wherein the setting window includes the image on which a trajectory of the object satisfying a predetermined condition is superimposed.

20. The information processing apparatus according to claim 19, wherein the setting window includes the image on which a trajectory of the object moving in a predetermined direction is superimposed.

21. The information processing apparatus according to claim 19, wherein the setting window includes the image on which a trajectory corresponding to a person designated by a user is superimposed.

* * * * *